United States Patent
Gaigg et al.

(10) Patent No.: US 11,735,784 B2
(45) Date of Patent: Aug. 22, 2023

(54) RECHARGEABLE BATTERY

(71) Applicants: AUDI Aktiengesellschaft, Ingolstadt (DE); Miba eMobility GmbH, Laakirchen (AT)

(72) Inventors: Stefan Gaigg, Gmunden (AT); Franz Poehn, Pettenbach (AT)

(73) Assignees: AUDI Aktiengesellschaft, Ingolstadt (DE); Miba eMobility GmbH, Laakirchen (AT)

(*) Notice: Subject to any disclaimer, the term of this patent is extended or adjusted under 35 U.S.C. 154(b) by 371 days.

(21) Appl. No.: 15/733,952

(22) PCT Filed: Jun. 7, 2019

(86) PCT No.: PCT/AT2019/060191
§ 371 (c)(1),
(2) Date: Dec. 1, 2020

(87) PCT Pub. No.: WO2019/237139
PCT Pub. Date: Dec. 19, 2019

(65) Prior Publication Data
US 2021/0234212 A1 Jul. 29, 2021

(30) Foreign Application Priority Data
Jun. 12, 2018 (AT) .............................. A 50475/2018

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 50/121* (2021.01); *H01M 50/271* (2021.01); *H01M 50/293* (2021.01)

(58) Field of Classification Search
None
See application file for complete search history.

(56) References Cited

U.S. PATENT DOCUMENTS 5,866,276 A * 2/1999 Ogami ................... B60L 50/64
429/151
9,546,827 B2 1/2017 Ludwig et al.
(Continued)

FOREIGN PATENT DOCUMENTS

CN 105529507 A 4/2016
CN 206259404 U 6/2017
(Continued)

OTHER PUBLICATIONS

International Search Report in PCT/AT2019/060191, dated Jan. 13, 2020.

*Primary Examiner* — Lisa S Park
(74) *Attorney, Agent, or Firm* — Collard & Roe, P.C.

(57) ABSTRACT

The invention relates to a rechargeable battery (1) comprising at least one storage module for electrical energy and at least one cooling device (2) for cooling or controlling the temperature of the at least one storage module, wherein the cooling device (2) has a single-layer or multilayer film (4, 9) and is lying with this film (4, 9) against the at least one storage module. The cooling device is provided with at least one stiffening element (19).

11 Claims, 9 Drawing Sheets

Figure 1:
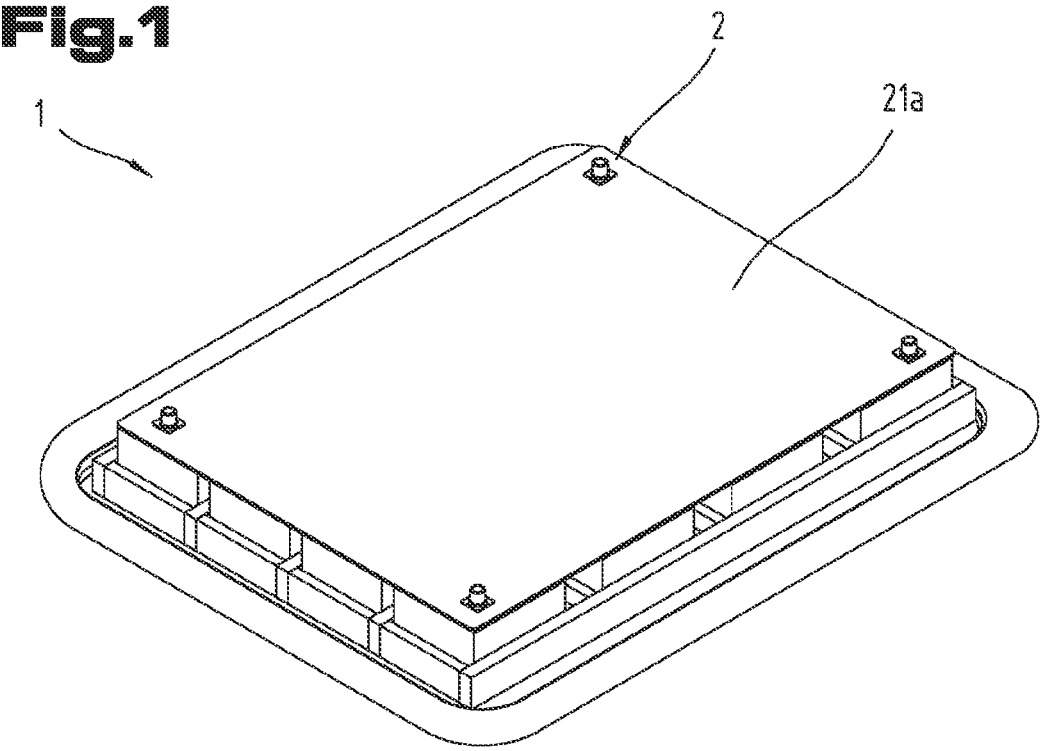

(51) Int. Cl.
*H01M 10/625* (2014.01)
*H01M 10/647* (2014.01)
*H01M 10/65* (2014.01)
*H01M 10/653* (2014.01)
*H01M 10/6568* (2014.01)
*H01M 50/121* (2021.01)
*H01M 50/271* (2021.01)
*H01M 50/293* (2021.01)

(56) References Cited

U.S. PATENT DOCUMENTS

| | | |
|---|---|---|
| 10,131,247 B2 | 11/2018 | Berger et al. |
| 2005/0089750 A1* | 4/2005 | Ng ................ H01M 50/112 429/62 |
| 2012/0156543 A1* | 6/2012 | Cicero ............ H01M 50/553 429/120 |
| 2015/0360550 A1 | 12/2015 | Berger et al. |
| 2018/0034117 A1 | 2/2018 | Bang et al. |

FOREIGN PATENT DOCUMENTS

| | | | |
|---|---|---|---|
| CN | 107331915 A | | 11/2017 |
| DE | 102011084000 A1 | | 5/2012 |
| DE | 10 2014 110 307 A1 | | 1/2016 |
| GB | 2549512 A | * | 10/2017 |
| GB | 2549512 A | | 10/2017 |
| JP | 2003-045504 A | | 2/2003 |
| JP | 2007-299638 A | | 11/2007 |
| JP | 2010-250984 A | | 11/2010 |
| WO | 2016/101872 A1 | | 6/2016 |

* cited by examiner

RECHARGEABLE BATTERY

CROSS REFERENCE TO RELATED APPLICATIONS

This application is the National Stage of PCT/AT2019/060191 filed on Jun. 7, 2019, which claims priority under 35 U.S.C. § 119 of Austrian Application No. A50475/2018 filed on Jun. 12, 2018, the disclosure of which is incorporated by reference. The international application under PCT article 21(2) was not published in English.

The invention relates to a rechargeable battery comprising at least one storage module for electrical energy and at least one cooling device for cooling or controlling the temperature of the at least one storage module, wherein the cooling device has a single-layer or multi-layer film and is lying with this film against the at least one storage module.

The service life and effectiveness as well as the safety of a rechargeable battery for e-mobility depend, among other factors, on the temperature during operation. For this reason, various concepts have been suggested for the cooling and/or temperature control of the rechargeable batteries. These concepts can be divided into essentially two types, namely air cooling and water cooling and/or in general cooling with liquids.

For water cooling, cooling bodies in which at least one coolant channel is formed are used. These cooling bodies are arranged between the individual modules of the rechargeable battery or on the modules. In this regard, a module is an individual unity of the rechargeable battery, i.e. not obligatorily just a cell.

The cooling bodies are subjected to changing temperatures. This, in turn, causes the cooling bodies to be subjected to changing pressures. This can lead to problems with cooling if, as a consequence, the contact between the cooling body and the heat source is partially lost.

The underlying object of the present invention is to improve safety of the cooling of a rechargeable battery.

In the aforementioned rechargeable battery, the object of the invention is achieved in that the cooling device is provided with at least one stiffening element.

In this regard, it is advantageous that, with the stiffening element, the deflection of the film and with it its lifting off the cells due to alternating pressure loads can be prevented and/or at least reduced. Thus, the contact of the cooling device on the cells across larger temperature ranges and thus its cooling effect can be improved. An additional advantage is that this way, the film can still be used for the cooling de-vice, meaning a change to stiffer and therefore heavier materials is not required.

According to an embodiment variant of the rechargeable battery, it can be provided that the stiffening element is an at least concavely or convexly curved surface element. The previously mentioned effects, in particular with respect to the small increase of the weight by the additional material for the stiffening element, can thus be further improved, as the curvature can provide the stiffening element with a favorable internal stress acting against the lifting of the film, whereby the stiffening element can be designed to be thinner.

For reasons of a better material utilization, it can also be provided in this regard that the concavely or convexly curved surface element is integrated into the rechargeable battery lid or at least partially forms it. The cooling device can hence practically be provided with a self-stabilization.

Due to the convex or concave curvature of the surface element, an intermediate space is formed between said surface element and the single-layer or multi-layer film. According to a further embodiment variant of the rechargeable battery, it can be provided that a foam element or a casting resin element is arranged in this at least one intermediate space. With said element, the function of the stiffening element can be further improved as the film can be additionally supported by said foam element. Furthermore, also a heat insulation of the cooling device can be achieved with the foam element. The foam element can have an insulating effect. This effect becomes important particularly in case of temperature control purposes of the cooling device and/or in case of low temperatures in the winter.

Preferably, according to an embodiment variant of the rechargeable battery, it can additionally be provided that the concavely or convexly curved surface element and/or the single-layer or multi-layer film is connected, in particular directly connected, to the foam element or the casting resin element. By means of this connection of the foam element to the surface element and/or the film, the bond strength of the cooling device can be improved overall, whereby, in turn, lower wall strengths of the stiffening element and thus, a lower weight of the cooling device are made possible. By avoiding intermediate elements or additional adhesives, weight can be saved and/or the required effort can be reduced.

According to a further embodiment variant of the rechargeable battery, it can be provided that the stiffening element is provided with a traction element. Said traction element allows to maintain the curvature of the stiffening element better and longer, even in the event of frequent alternating temperature loads. It also allows to reduce the wall thickness of the stiffening element, whereby it can be brought into the curved state with little effort.

For increasing the efficiency of the cooling of the rechargeable battery, it may be provided that the single-layer or multi-layer film forms multiple cooling channels, wherein liquid-tight seams are formed between the cooling channels.

According to an embodiment variant, it can additionally be provided that the liquid-tight seams are provided with at least one seam support element, whereby the seams can also be better protected from damage due to alternating pressure loads.

According to a further embodiment variant of the rechargeable battery it can preferably be provided that the seam support element is formed by the at least one foam element or the casting resin element, which abuts on the liquid-tight seams for this purpose. The stiffening element can therefore fulfill both functions, whereby the construction of the cooling device can be simplified and thus, be designed having a relatively low weight.

For further improving the protection of the seams from damage due to alternating pressure loads, it can be provided that the liquid-tight seams are provided with seam support elements on both sides.

According to a different embodiment variant of the rechargeable battery, it can also be provided, for supporting the seams, that the at least one seam support element is formed by a surface element, in which beadings are formed where the liquid-tight seams are and/or in which stiffening ribs are formed.

For higher loads, it can also be provided that the at least one stiffening element is formed by a surface element, on which at least one stiffening rib is formed.

The cooling device hast at least coolant inlet and at least coolant outlet, wherein, according to a further embodiment variant of the rechargeable battery, it can be provided that the coolant inlet and the coolant outlet are arranged in an integral mold piece.

For a better protection against the formation of leakages due to alternating pressure loads, it can be provided in this regard that a sealing element is integrated into the mold piece for the sealing connection of the mold piece to the single-layer or multi-layer film. Thus, the number of sealing points can be reduced.

For the purpose of better understanding of the invention, it will be elucidated in more detail by means of the figures below.

Figure 2:
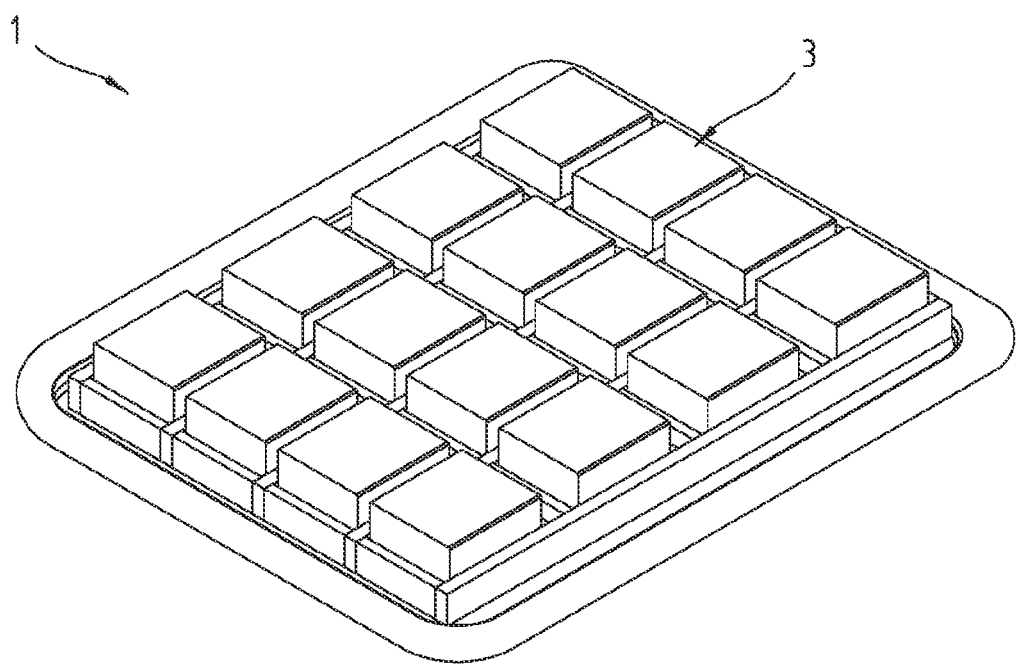
Figure 3:
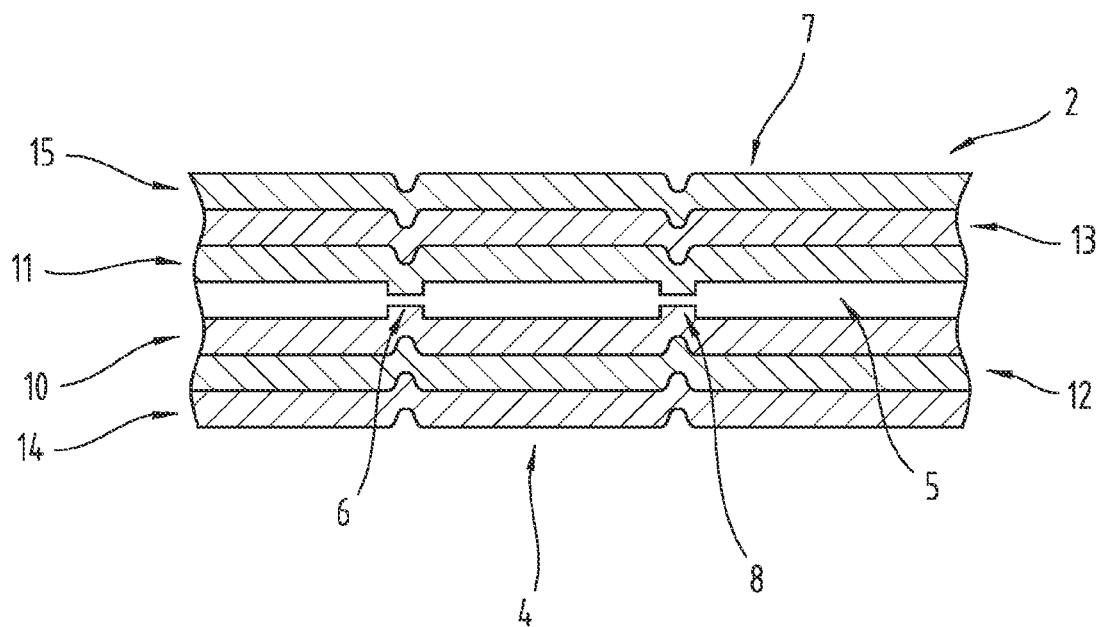
Figure 4:
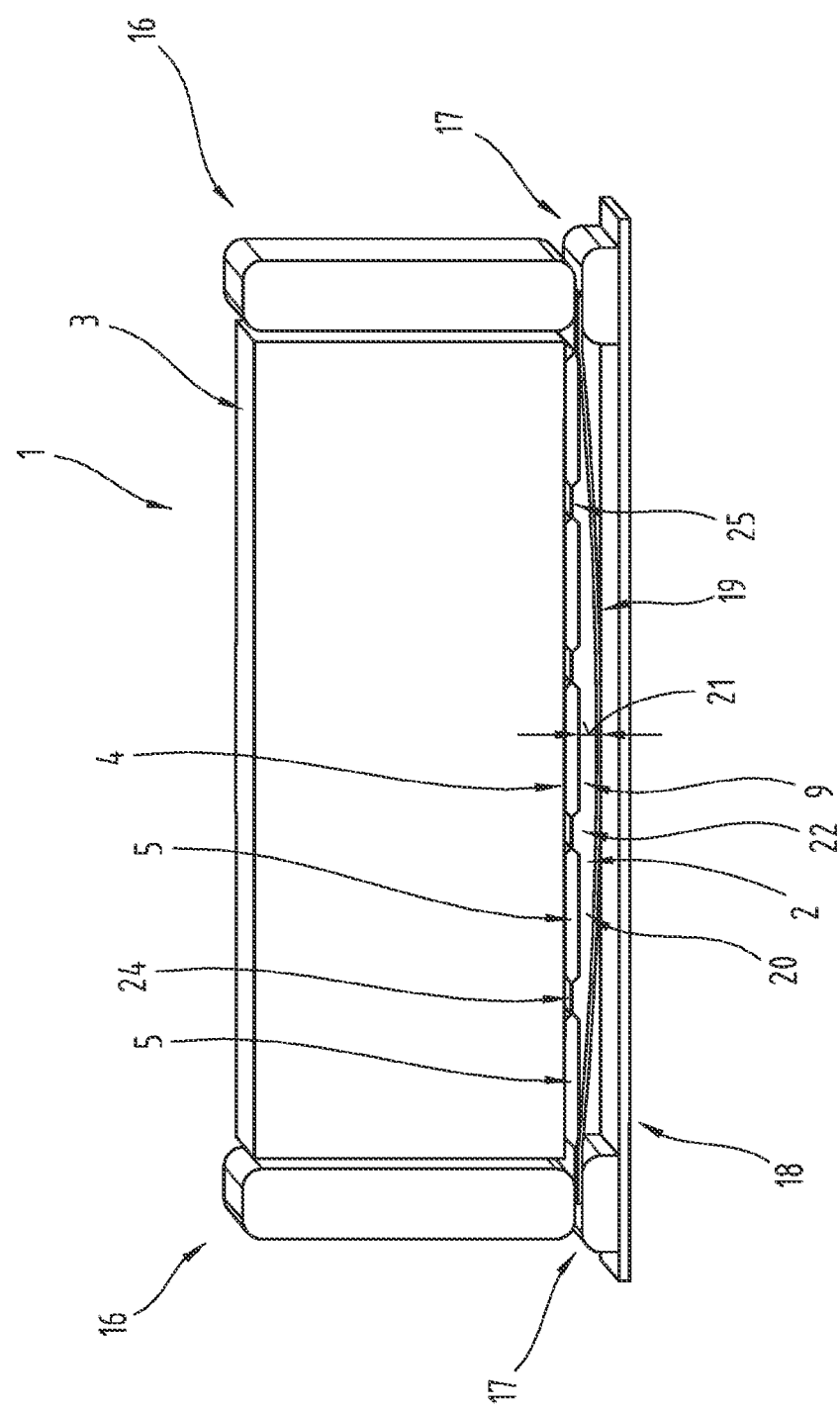
Figure 5:
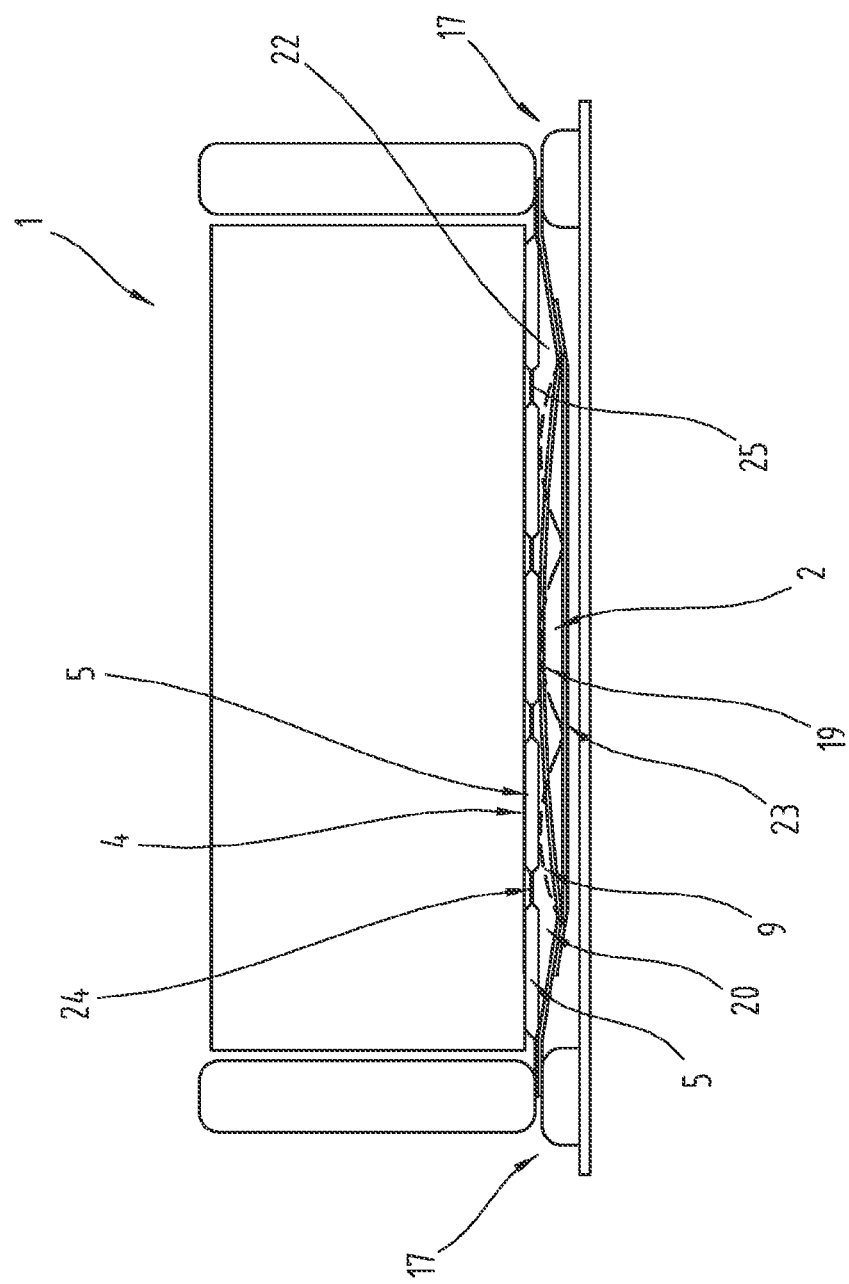
Figure 6:
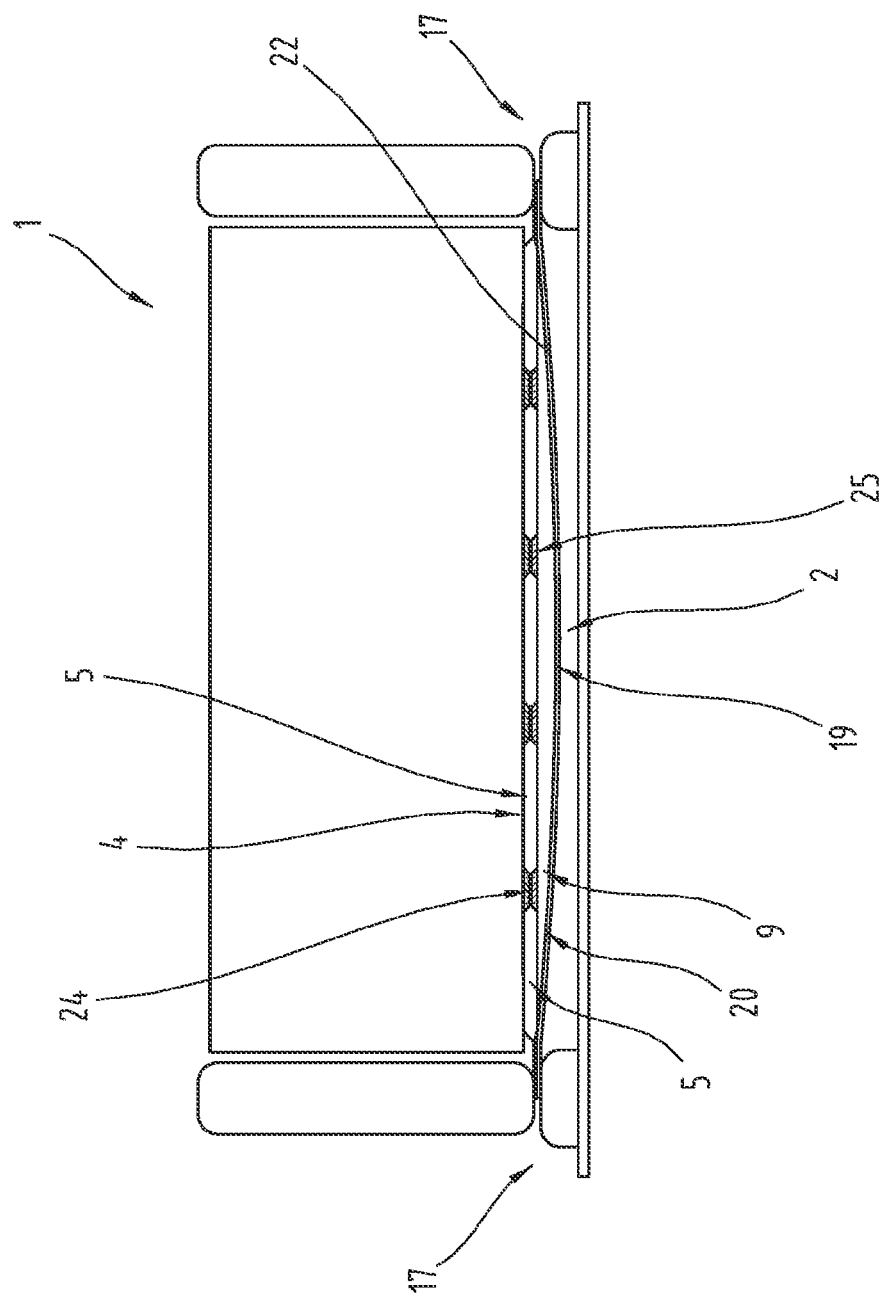
Figure 7:
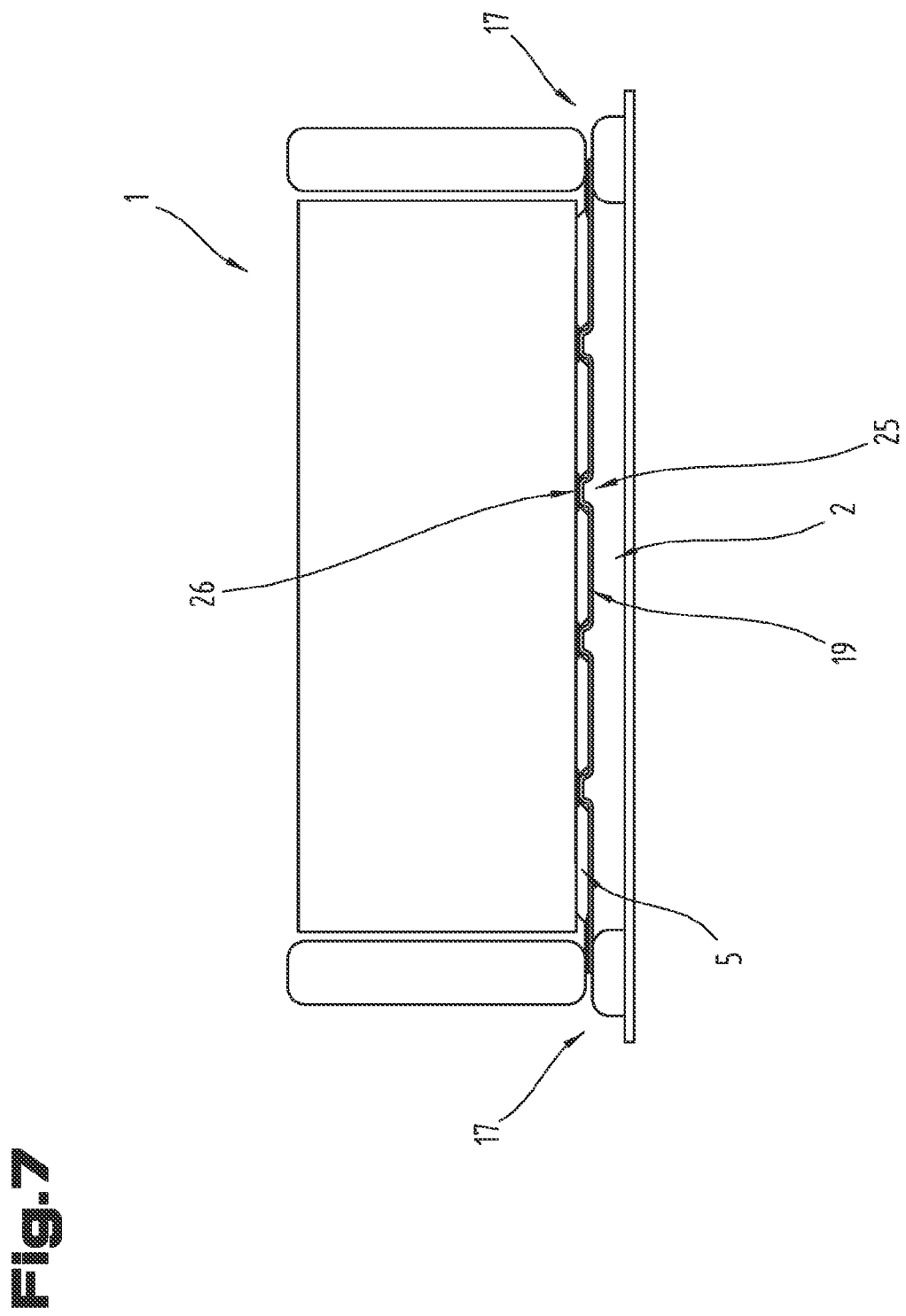
Figure 8:
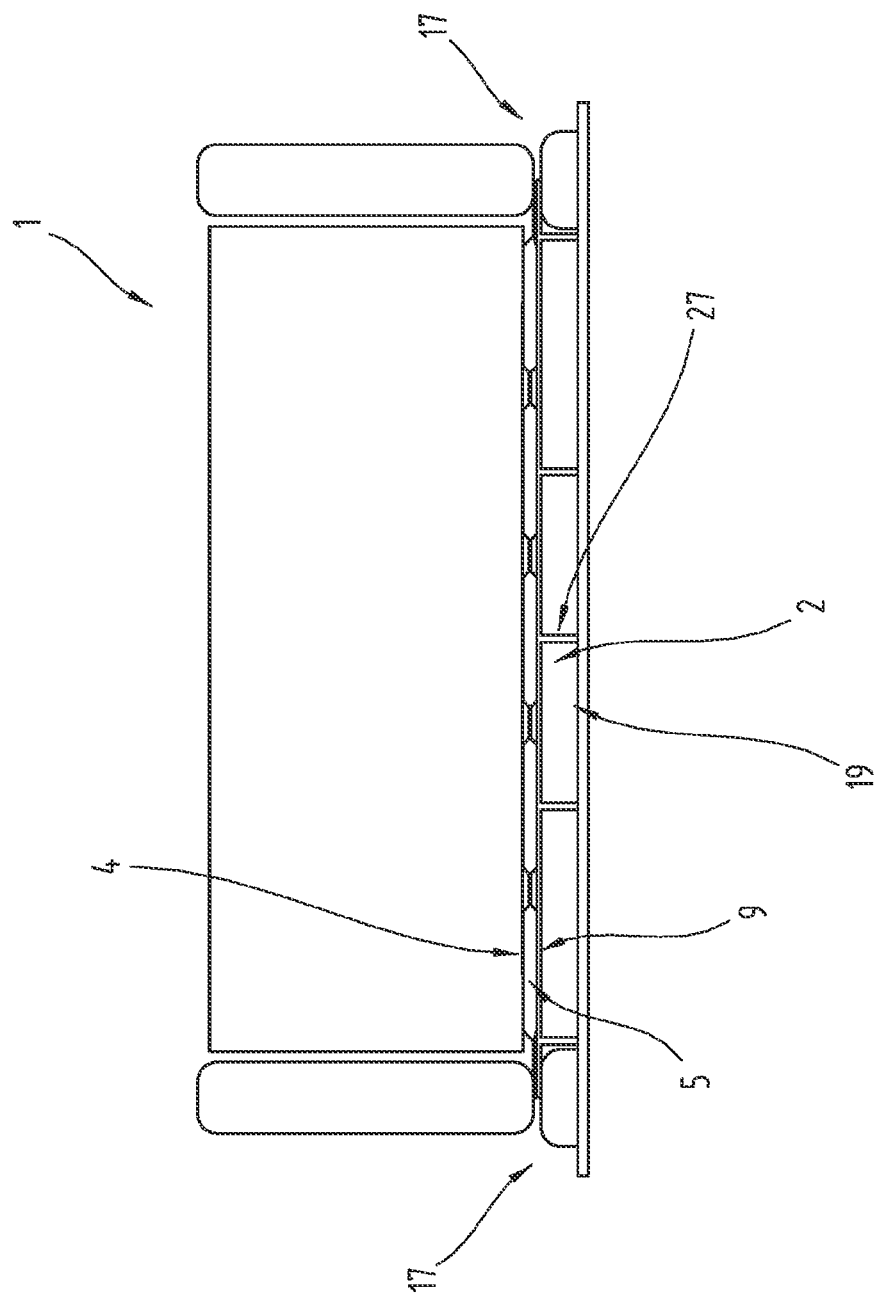
Figure 9:
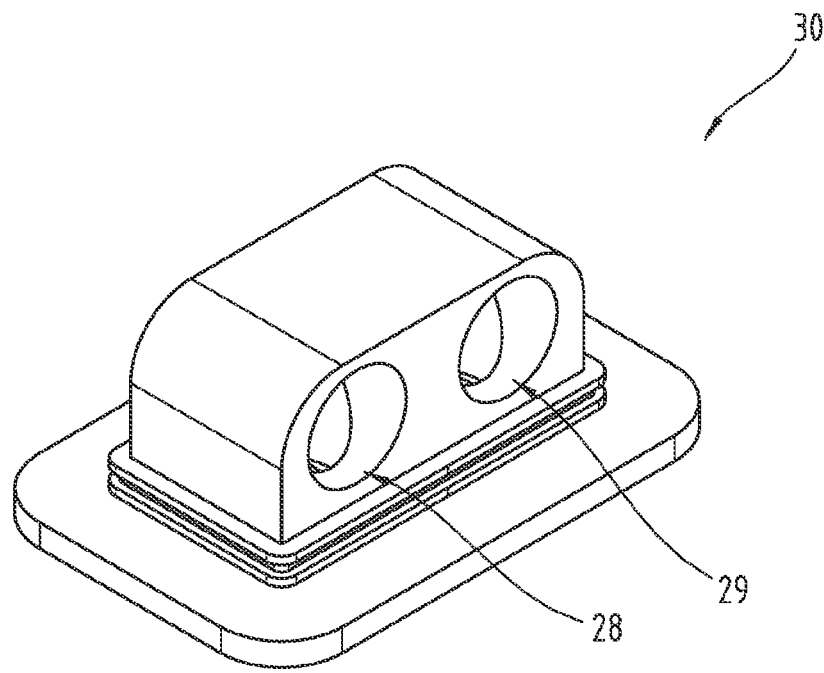
Figure 10:
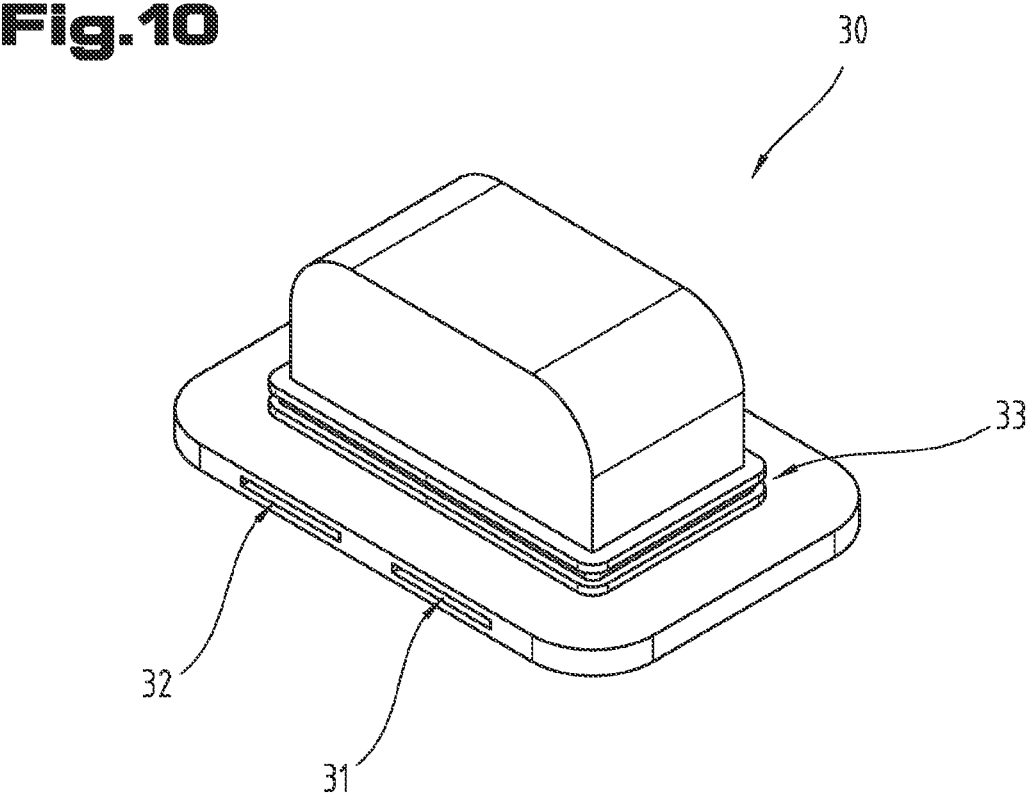
Figure 11:
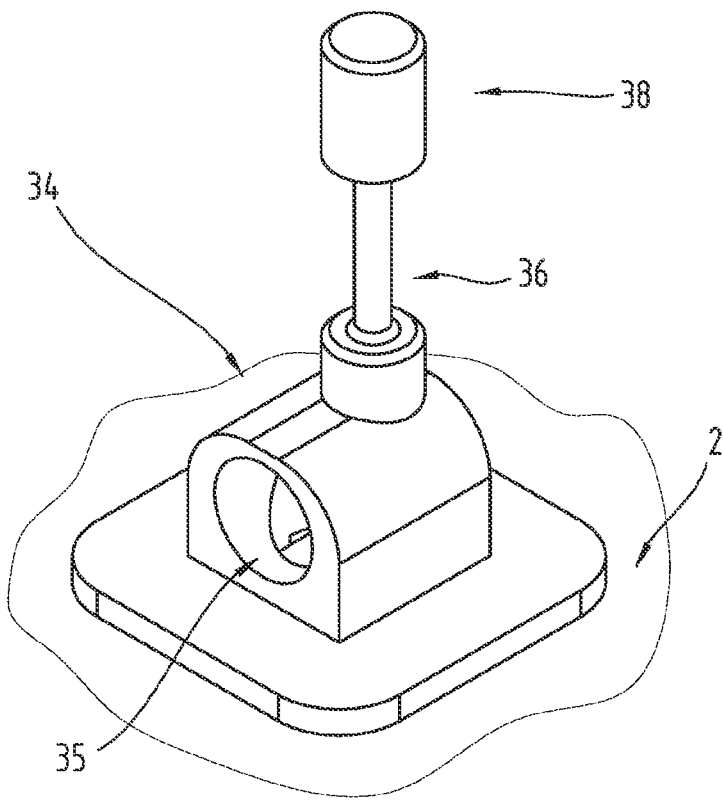
Figure 12:
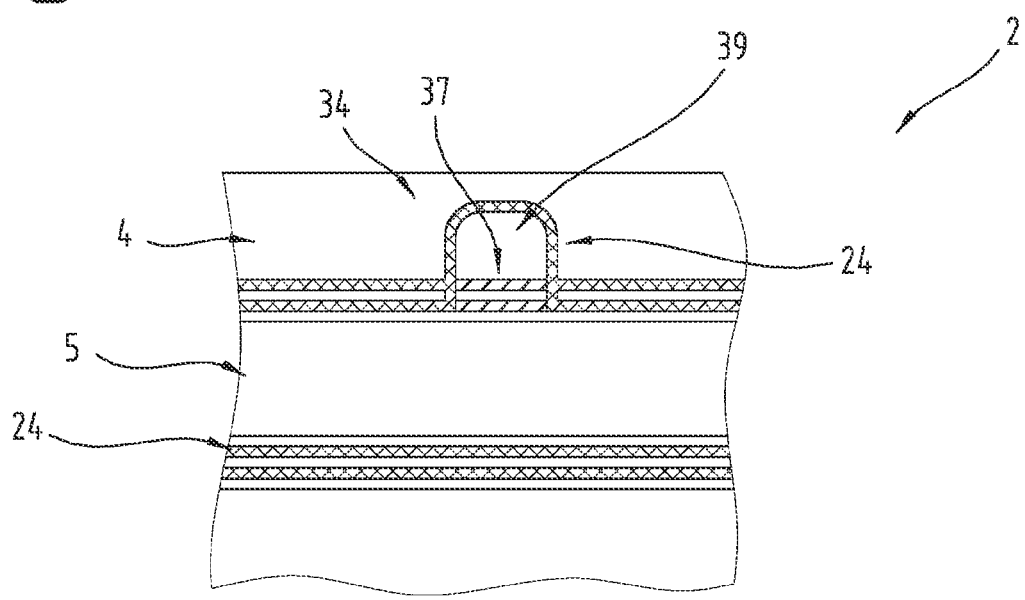

These show in a simplified schematic representation:

FIG. 1 a rechargeable battery in an oblique view with a cooling device;

FIG. 2 the rechargeable battery according to FIG. 1 in an oblique view without the cooling device;

FIG. 3 a cutout from the cooling device;

FIG. 4 an embodiment variant of the rechargeable battery;

FIG. 5 a further embodiment variant of the rechargeable battery;

FIG. 6 a different embodiment variant of the rechargeable battery;

FIG. 7 an embodiment variant of the rechargeable battery;

FIG. 8 a further embodiment variant of the rechargeable battery;

FIG. 9 a detail of a different embodiment variant of the rechargeable battery in an oblique front view;

FIG. 10 the detail of the embodiment variant of the rechargeable battery according to FIG. 10 in an oblique rear view;

FIG. 11 a detail of a further embodiment variant of the rechargeable battery in an oblique view;

FIG. 12 a detail from a different embodiment variant of the rechargeable battery.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIGS. 1 and 2 show a rechargeable battery 1, i.e. an accumulator, in an oblique view, with FIG. 1 showing the rechargeable battery 1 with a cooling device 2 and FIG. 2 showing the rechargeable battery 1 without this cooling device 2.

The rechargeable battery 1 comprises at least one cell 3, preferably multiple cells 3 for electrical energy. In the represented example there are 27 cells 3. However, this number is not to be considered restricting.

The cells 3 can be formed to be cuboid, cube-shaped, cylindrical, etc.

As the basic construction of such rechargeable batteries 1 for e-mobility is known from the prior art, reference is made thereto so as to avoid repetitions.

As can be seen from the comparison of the two FIGS. 1 and 2, the cooling device 2 is arranged on a side of the rechargeable battery 1, in particular on the top. However, it can also be provided for that the cooling device 2 extends across at least two surfaces of the rechargeable battery 1, for example on the top and laterally and optionally on the bottom. In the alternative or in addition to this, the cooling device 2 can also be arranged between the cells 3 or below the cells 3.

It is preferred if the cooling device 2 extends across all of the cells 3, such that all cells 3 can be cooled by means of just one cooling device 2. However, in general, it is also possible to provide several cooling devices 2 in the rechargeable battery 1, for example two or three or four, such that for example the cells 3 are distributed to two or three or four, etc. cooling devices 2.

Reference is made to the fact that the terms upper side etc. refer to the installation position of the rechargeable battery 1.

Further reference is made to the fact that the cells 3 can be formed modularly such that these can also be referred to as storage modules.

In all embodiment variants, the cooling device 2 comprises a single-layer or multi-layer film 4 or consists thereof, as can be seen from FIG. 3. By means of this film 4, the cooling device 2, in particular directly, lies against cells 3. As the film 4 is flexible, i.e. not stiff, said film 4 can better adapt to surface irregularities of the cells 3 or between the cells 3. A leveling compound between the cooling device 2 and the cells 3 is not required.

The cooling device 2 can comprise the and/or a single-layer or multi-layer film 4 on one side or on both sides.

Moreover, the cooling device 2 comprises at least one coolant channel 5, which extends from at least one inlet to at least one outlet. The at least one coolant channel 2 is formed within the single-layer or multi-layer film 4 or between two single-layer or multi-layer films 4 or between this film 4 and the metal layer by a just partial connection of the film(s) 4 or of the film 4 to the metal layer. For example, the at least one coolant channel 5 can be produced by bonding or welding of the film(s) 4 forming webs 6. In this regard, the at least one coolant channel 5 emerges in the non-connected regions of the film(s) 4 next to the webs 6. Other suitable connecting techniques can also be used for connecting the film(s) 4 or the film 4 to the metal layer. In general, the connecting techniques are preferably selected such that no additional measures need to be taken to obtain a liquid-tight design of the connection.

The coolant channel 5 can be formed to extend in a meandering manner in the cooling device 2. The respectively optimized extent of the at least one coolant channel 5 is among other factors determined by the amount of heat that needs to be conducted away, the geometry of the rechargeable battery 1, etc. It can also be provided for that more than one coolant channel 5 is formed and/or arranged in the cooling device 2. In this case, it is advantageous if a common inlet is arranged in front of the several coolant channels 5 and a common outlet behind them, which can each be formed as collecting channels, from which the coolant channels 5 branch out or into which they flow. However, it is also possible that each coolant channel 5 has its own inlet 6 and/or its own outlet 7.

In particular, a liquid such as a water-glycol mixture is used as the coolant by which the cooling device 2 is flown through.

The cooling device 2 according to FIG. 3 comprises the film 4 and a further single-layer or multi-layer film 7. The film 4 and the further film 9 are connected to one another in connection areas 8 forming the at least one coolant channel 5 between the film 4 and the further film 9. The connection areas 8 can extend along the longitudinal extent of the at least one coolant channel 5, wherein between the connection areas 8 non-connected areas remain, in which the at least one coolant channel 5 is formed by the distancing of the film 4 with respect to the further film 9. The film 4 and the further film 9 extend across a surface, which preferably at least approximately, in particular to 100%, corresponds to the surface of the cooling device 2 (as viewed in a plan view).

The film 4 and the further film 9 can consist of a laminate comprising a first plastic film 10, 11, an enforcement layer 12, 13 connected thereto, a metal film 14 and/or 15 connected to the enforcement layer 12 and/or 13 or a metalized further plastic film. However, it should be noted that in particular the film 4 resting against the cells 3 can also be formed from the plastic film 10 as a single layer.

In general, other laminates can be used as well. For example, merely the film 4 can be provided with the metal film 13 or merely the further film 9 can be provided with the metal film 15. Likewise, merely the film 4 can comprise the enforcement layer 12 or merely the further film 9 can comprise the enforcement layer 13. Likewise, structures of the film 4 and/or the further film 9 with more than three layers are possible. However, preferably, the film 4 and the further film 9 are designed equally.

The at least one coolant channel 5 is formed by the just partial connection of the film 4 to the further film 10. The wall and/or the walls of the at least one coolant channel 5 are thus formed by the film 4 and the further film 10, preferably half by each.

The first plastic films 10, 11 and/or the metalized further plastic film preferably consists/consist to at least 80 wt. %, in particular at least 90 wt. %, of a thermoplastic material or of an elastomer. The thermoplastic material can be selected from a group comprising and/or consisting of polyethylene (PE), polyoxymethylene (POM), polyamide (PA), in particular PA 6, PA 66, PA 11, PA 12, PA 610, PA 612, polyphenylene sulphide (PPS), polyethylene terephthalate (PET), crosslinked polyolefins, preferably polypropylene (PP). The elastomer can be selected from a group comprising and/or consisting of thermoplastic elastomers such as thermoplastic vulcanizates, olefin-, amine-, ester-based thermoplastic polyurethanes, in particular ether-based/ester-based thermoplastic elastomers, styrene block copolymers, silicone elastomers.

At this point, it should be noted that the term plastic material is understood as a synthetic or natural polymer produced from corresponding monomers.

Preferably, the first plastic film 10, 11 and/or the metalized further plastic film consists/consist of a so-called sealing film. This has the advantage that the respective films can be connected to one another directly.

However, it is also possible to use other plastic materials, such as thermosetting plastic materials and/or thermosetting materials, which are then for example adhered to one another by means of an adhesive. Two-part adhesive systems based on polyurethane or silicone or hot melt adhesive systems are particularly suitable for this purpose.

Preferably, the enforcement layer/enforcement layers 12, 13 comprise/comprises a or consist/consists of a fiber reinforcement which is preferably formed as a separate layer. The fiber reinforcement can be formed of fibers and/or threads, which are selected from a group comprising or consisting of glass fibers, aramid fibers, carbon fibers, mineral fibers such as basalt fibers, natural fibers such as hemp, sisal and combinations thereof.

The proportion of the fibers, in particular the glass fibers, in the fiber reinforcement can amount to at least 80 wt. %, in particular at least 90 wt. %. Preferably, the fibers and/or threads of the fiber reinforcement consist merely of glass fibers.

The fibers and/or threads can be present in the fiber reinforcement as roving, for example as a non-woven fabric, as a knitted fabric, as a woven fabric etc.

The metal film 14, 15 in particular is an aluminum film. However, other materials such as copper or silver can also be used.

The metal film 14, 15 can have a layer thickness of between 5 µm and 100 µm. The plastic films 10, 11 can have a layer thickness of between 10 µm and 200 µm. The layer thickness of the enforcement layer(s) 12, 13 can amount to between 5 µm and 50 µm.

The preceding explanations regarding the rechargeable battery 1 according to FIGS. 1 to 3 can be applied to all embodiment variants of the rechargeable battery 1 described in the following. FIGS. 4 to 12 additionally show optionally independent embodiment variant of the rechargeable battery 1 and/or details thereof. Equal reference numbers and/or component designations are again used for equal parts as in FIGS. 1 to 3. In order to avoid unnecessary repetitions, it is pointed to/reference is made to the detailed description regarding FIGS. 1 to 3. Furthermore, the explanations regarding all further embodiment variants shown in the remaining figures and described in this description may also be applicable to the embodiment variant of the rechargeable battery 1 depicted in a specific figure.

It is noted that in FIGS. 4 to 12, components of the rechargeable battery 1 are in part shown in a stylized manner if they are not necessary for understanding the invention and/or the respective embodiment variant of the rechargeable battery 1.

The rechargeable battery 1 according to FIG. 4 again comprises the at least one storage module for electrical energy with at least one cell 3 and at least one cooling device 2. As described above, the cooling device 2 can comprise a single-layer or multi-layer film 4, 9 and abut, in particular directly abut, on the at least one storage module with said film 4, 9, as it can be seen in FIG. 4.

The at least one storage module can be laterally flanked by holding elements 16. Said holding elements 16 may be arranged, for example on support elements 17, for example support sheet metals or support elements 17 of plastic, on which they stand. The support elements 17 are preferably configured in a dome shape and/or cap shape, so that an intermediate space is formed between a covering 18 or a base plate, e.g. a rechargeable battery receptacle, and/or a footprint of the rechargeable battery 1.

The cooling device 2 is provided with and/or comprises at least one stiffening element 19. With the aid of the stiffening element 19, deformations of the cooling device 2 due to the pressure of the coolant therein can be reduced.

In the embodiment variant of the rechargeable battery 1 according to FIG. 4, the stiffening element 19 is configured as a surface element, wherein the rechargeable battery may comprise one or multiple such surface elements. The surface element may, for example, be a sheet metal, e.g. from aluminum or steel. The surface element may, however, also consist of and/or comprise a polymeric plastic.

As is evident in the depiction in FIG. 4, the at least one stiffening element 19 of this embodiment variant of the rechargeable battery 1 is curved in a convex manner. As a consequence, the stiffening element 19 is arranged partially distanced from the film 4 and/or 9, forming an intermediate space 20.

The stiffening element 19 is supported on the support elements 17 and is particularly arranged between the support elements 17 and the holding elements 16. The stiffening element 19 may be connected to the support elements 17 and/or the holding elements 16, for example be connected in a positive locking manner and/or a materially bonded manner and/or a force-fitted manner. For example, the stiffening element 19 may be welded to the support elements 17 and/or the holding elements 16.

The stiffening element 19 may, however, also be arranged at a different location, as long as it can fulfill its effect for supporting the cooling device 2, in particular the film 4 or 9, if necessary.

The deformation of the stiffening element 19 can be up to 15 mm, in particular between 1 mm and 10 mm, out of the plane. This means that a greatest distance 21 starting from the point of the greatest deflection (based on an entirely flat element with no curvature) amounts to a maximum of 15 mm, in particular between 1 mm and 10 mm.

FIG. 5 shows an embodiment variant of the rechargeable battery 1, which substantially corresponds with that of FIG. 4 (such that the explanations regarding FIG. 4 can also largely apply here), with the difference that the stiffening element 19 is curved in a concave manner Due to the concave curvature of the stiffening element 19 the middle region of the cooling device 2 is also supported, alternatively or in addition to the side regions of the cooling device 2. In this regard, this support can be configured such that the stiffening element 19 in this middle region directly abuts on the film 4 or 9 of the cooling device 2, as it can be seen in FIG. 5.

For obtaining the concave curvature of the stiffening element 19, it can first be curved in a convex manner in side sections, as it is also the case in the stiffening element 19 according to FIG. 4, in order to subsequently transition into the concavely curved middle region as it is shown in FIG. 5. In this regard, the stiffening element 19 can abut on the lateral support elements 17 across a larger surface region compared to the embodiment variant of the rechargeable battery 1 according to FIG. 4, to thus make a greater concave curvature possible.

Only for the sake of completeness, it is noted that in case of the convex embodiment of the stiffening element 19 according to FIG. 4, it can only abut on the film 4 or 9 of the cooling device 2 in the side regions.

In addition to the described difference between the embodiment variants of the rechargeable battery 1 according to FIGS. 4 and 5, a further difference may be present. Namely, if the stiffening element 19 abuts directly, meaning immediately, on the film 4 or 9 of the cooling device 2, more than one intermediate space 20 is formed between the film 4 or 9 and the stiffening element 19.

It is further noted that FIG. 5 only shows a middle region having a concave curvature of the stiffening element 19. However, it is also possible that the middle region may comprise multiple regions next to one another having a concave curvature, for example two or three, such that, in this case, the stiffening element 19 can abut (immediately) on the film 4 or 9 in multiple regions, for example two or three, as it is depicted in dashed lines in FIG. 5.

In the convex embodiment variant of the stiffening element 19 according to FIG. 4, as well, multiple convex regions can be formed next to one another in this sense, wherein the stiffening element 19 can, in this case, also possibly abut (immediately) on the film 4 or 9 in a middle region of the stiffening element 19. In this case, the embodiment variant of the rechargeable battery 1 according to FIG. 4 can also have multiple intermediate spaces 20 between the stiffening element 19 and the film 4 or 9 of the cooling device 2.

However, the stiffening element 19 may also be formed as a mixed variant of the embodiments shown in FIGS. 4 and 5, so that the stiffening element 19 thus can have both regions with a concave curvature and regions with a convex curvature.

In the preceding explanations regarding FIGS. 4 and 5, the stiffening element 19 has been described as a separate component of the rechargeable battery 1. However, according to an embodiment variant of the rechargeable battery 1, it is also possible to integrate the stiffening element 19 into a rechargeable battery lid 22 (FIG. 1), or to form it at least partly thereof, so that the rechargeable battery lid 22 can be part of the cooling device 2. The rechargeable battery lid 22 can therefore be configured having a concave or a convex curvature.

As previously explained, at least one intermediate space 20 (FIGS. 4 and 5) can be formed between the stiffening element 19 and the film 4 or 9 of the cooling device 2. In principle, said at least one intermediate space 20 can be empty. According to a different embodiment variant of the rechargeable battery 1, it may be provided that a foam element 22 is arranged in at least one, in particular in all of said intermediate spaces 20, as it can be seen in FIGS. 4 and 5, which also show this embodiment variant. For example, a polyurethane foam or a polyethylene foam may be used as the foam. Generally, a foam made of an organic or a natural polymer may be used. The production of these foams is known per se, so that any further explanations regarding this can be dispensed with.

The at least one foam element 22 can, fully foamed, be placed on the film 4 or 9 of the cooling device 2 as a mold element, before the stiffening element 19 is arranged. However, it may also be inserted into the at least one intermediate space 20 after arranging the stiffening element 19. If necessary, the foam element 22 can be bonded with the stiffening element 19 and/or the film 4 or 9 of the cooling device 2 by means of an adhesive, so that the concavely and/or convexly curved surface element and/or the single-layer or multi-layer film 4 or 9 is connected to the foam element 22.

According to an embodiment variant of the rechargeable battery 1, it is also possible that the at least one intermediate space 20 is foamed between the stiffening element 19 and the film 4 or 9 of the cooling device 2, so that the foam element 22 is produced on site. Thus, it is possible to directly, i.e. immediately, connect the foam element 22 to the concavely and/or convexly curved surface element, i.e. the stiffening element 19, and/or the single-layer or multilayer film 4 or 9 to the foam element 22, without further auxiliary materials. For this purpose, the foamable mass for producing the foam element 22 can be introduced into the at least one intermediate space 20 and subsequently be foamed.

Instead of the foam element 22, it is also possible to insert a casting resin element made from casting resin. Regarding the effects achieved by this, reference is made to the relevant preceding explanations regarding the foam element 22.

As the casting resin, a known casting resin, for example a polyester resin, an epoxy resin, a silicone resin, a vinyl ester resin, a phenol resin, an acrylic resin etc. may be used.

The casting resin element and the foam element 22 can also be combined in the at least one intermediate space 20. For example, the casting resin element can be installed so as to directly abut on the film 4 or 9 at least in some regions, and the foam element 22 can be installed so as to directly abut on the casting resin element.

FIG. 5 shows a further, optionally independent embodiment variant of the rechargeable battery 1. In this, the stiffening element 19 is provided with at least one traction element 23. Just one single traction element 23 may be provided. However, multiple traction elements 23, for example two or three or four etc., may also be arranged in the rechargeable battery 1.

The at least one traction element 23 can also be a surface element, for example a strip. However, other embodiments are also possible. Thus, the traction element 23 can be for example a rope or a woven fabric.

The at least one traction element 23 can consist of and/or comprise a metal, for example a metal sheet or a wire cable. For example, the traction element 23 may consist of a steel. However, other materials may also be used, such as woven carbon fabric etc.

With the aid of the at least one traction element 23, the concave curvature of the stiffening element 19 can be produced and/or maintained. For this, the at least one traction element 23 can be connected to the stiffening element 19, for example materially bonded, e.g. by welding, and/or positively locking and/or force-fitting. For the positively locking connection, the stiffening element 19 may, for example, comprise at least one recess, in which or through which the traction element 23 reaches. Other positively locking embodiments are equally possible.

The at least one traction element 23 can also rest on the support elements 17 and possibly be connected with them according to preceding explanations. In particular, the at least one traction element 23 can be arranged between the stiffening element 19 and the support elements 17, as it can be seen in FIG. 5.

While the at least one traction element 23 is preferably arranged on the side of the stiffening element 19 facing away from the film 4 or 9, it may also be arranged on the side of the stiffening element 19 facing the film 4 or 9, for example also be enclosed in foam.

As previously explained, the single-layer or multi-layer film 4 and/or 9 forms at least one coolant channel 5, which is arranged particularly to extend in a meandering manner Preferably, however, multiple coolant channels 5 are provided. For forming the at least one coolant channel 5, the single-layer or multi-layer film 4 and/or 9 is/are partially connected to one another, whereby the coolant channels 5 between the two film layers are formed in the regions of the single-layer or multi-layer film 4 and/or 9 that are not interconnected. The connection areas can be established, for example by bonding. Preferably, however, they are established by welding of film. In any case, seams 24 are formed in the connected regions, as it can be seen in FIGS. 4 and 5.

According to a further embodiment variant of the rechargeable battery 1, it is now possible to better protect said seams 24 from breakage by providing them with at least one seam support element 24 and/or arranging said element 25 on the seams 24.

The at least one seam support element 25 can, for example, be formed by foam element 22 or the casting resin element, which can be arranged so as to abut on the liquid-tight seams 24 for this purpose. For this purpose, the foam element 22 or the casting resin element can be formed in the region of the seams 24 with elevations, as it is depicted in FIGS. 4 and 5.

It is noted at this point that the foam element 22 may also be designed to be completely flat on the surface facing the film 4 or 9 of the cooling device 2, meaning that it may be arranged in the rechargeable battery 1 so as not to abut on the seams 24.

Furthermore, it is noted that the trapezoidal cross-section of the elevations of the foam element 22 in the region of the seams 24 is depicted in an idealized manner. Reality may deviate from this cross-sectional shape after the coolant channels are formed by the single-layer or multi-layer film 4 and/or 9.

The at least one foam element 22 or the casting resin element preferably abuts on at least approximately the entire, in particular the entire, surface of the seams 24, which faces the foam element 22. However, it is also possible for the foam element 22 or the casting resin element to only partially abut on the seams 24, meaning that only a part of said surface is directly supported by the foam element 22.

As it can be seen in the embodiment variants of the rechargeable battery 1 according to FIGS. 4 and 5, the seam support element 25 and/or the seam support elements 25 can be arranged only on one side of the seam 24 and/or the seams 24. According to a further embodiment variant of the rechargeable battery 1, however, it is also possible that the seam support element 25 and/or the seam support elements 25 are arranged on both sides of the seam 24 and/or the seams 24 of the cooling device 2, as FIG. 6 shows. The specific depiction with the convexly curved stiffening element 19 is not to be understood in a limiting sense here. In the embodiment variant of the rechargeable battery 1 according to FIG. 6, a concavely curved stiffening element 19, as it can be seen in FIG. 5, can also be used.

FIG. 6 shows a further embodiment variant of the rechargeable battery 1. The seam support elements 25 can be generally provided as separate components, thus also on the side of the single-layer or multi-layer film 4 or 9 of the cooling device 2 facing the foam element 22 or the casting resin element. Said seam support elements 25 can, for example, consist of a metal, e.g. of aluminum or a steel, or of a composite material, such as a resin-bonded fiber material, or of paper and/or of cardboard, or of a plastic.

FIG. 7 shows a different embodiment variant of the rechargeable battery 1 with seam support elements 25. In this regard, the stiffening element 19 is again formed as a surface element, however, without the previously described concave or convex curvature. In this surface element, beadings 26 are formed where the liquid-tight seams 24 are, which beadings 26 form the seam support elements 25 which abut (immediately) on the seams 24. Moreover, reference is made to the description of the further embodiment variants for further details, as it has already been noted at the beginning.

FIG. 7 shows an embodiment variant of the rechargeable battery 1, in which the at least one stiffening element 19 is formed by a surface element, on which stiffening ribs are formed. The stiffening ribs 27 are arranged particularly on the side facing away from the single-layer or multi-layer film 4 or 9. The stiffening ribs 27 can have any suitable shape. Furthermore, the stiffening ribs 27 can be provided in any suitable arrangement, for example as simple strips or in the shape of a quadrangle grind or hexagon grid etc.

Although no seam support element 25 is depicted in FIG. 8, such stiffening ribs may also be provided in addition to the beadings 26, for example in the embodiment variant of the rechargeable battery 1 according to FIG. 6 with the beadings 26.

FIGS. 9 and 10 show a detail of another embodiment variant of the rechargeable battery 1 (FIG. 1).

The cooling device 2 has, as has been explained above, at least one inlet and at least one outlet for the coolant. According to the embodiment variant depicted in FIGS. 9 and 10, it may now be provided that a coolant inlet 28 and a coolant outlet 29 are arranged and/or formed in a common, integral mold piece 30 (in one fitting). The coolant inlet 28 preferably opens into, and the coolant outlet 29 preferably departs from corresponding coolant channel connections 31, 32 of the mold piece 30, as it can be seen in FIG. 10.

According to an embodiment variant of the rechargeable battery 1, it can additionally be provided that at least one sealing element 33 is integrated into the mold piece 30 for the sealing connection of the mold piece 30 to the single-layer or multi-layer film 4 or 9.

The mold piece 30 is preferably connected to the single-layer or multi-layer film 4 or 9 by means of welding. The mold piece 30 therefore preferably consists at least partially, in particular entirely, of one or multiple plastic(s).

FIG. 11 shows a detail of a further, optionally independent, embodiment variant of the rechargeable battery 1 (FIG. 1).

In this embodiment variant, the rechargeable battery 1 again comprises, as described above, at least one storage module for electrical energy and at least one cooling device 2 for cooling or controlling the temperature of the at least one storage module, wherein the cooling device 2 has a single-layer or multi-layer film 4 and is lying with this film 4 against the at least one storage module 3. In this regard, reference is made to the explanations above.

In this embodiment variant of the rechargeable battery 1, the cooling device 2 has at least one excess pressure element 34. The at least one excess pressure element 34 is integrated into the coolant circuit and comprises at least one inlet 35 and at least one outlet 36.

An advantage of this is that the at least one excess pressure element 34 can help prevent the film from lifting 4 when the pressures are too high, whereby the efficiency of the cooling of the rechargeable battery 1 can be improved, too. An additional advantage of is that this way, the film can still be used for the cooling device 2, meaning a change 4 to stiffer and there-fore heavier materials is not required.

In particular, the excess pressure element 34 can be configured as a pressure relief valve. Thus, an arising excess pressure can be repeatedly released.

According to an embodiment variant of the rechargeable battery 1, it can further be provided that the excess pressure element 34 is combined with the previously described mold piece 30 for the coolant inlet 28 and the coolant outlet 29, in particular is formed in one piece with the mold piece 30.

According to another embodiment variant of the rechargeable battery 1 depicted in FIG. 12, it can be provided that the single-layer or multi-layer film 4 and/or 9 forms multiple coolant channels 5, and the liquid-tight seams 24 are formed between the coolant channels 5, wherein at least one of said seams 24 forms a predetermined breaking seam 37 for the formation of the excess pressure element 34. This allows to provide a one-off excess pressure protection.

In principle, it can be provided that the excess pressure (and the coolant escaping with it) is released into the environment. Preferably, however, according to a further embodiment variant of the rechargeable battery 1, as it is shown in FIG. 11, the excess pressure element 34 can be connected to an excess pressure container 38, so that direct contacts between the cooling liquid and electrical components of a vehicle equipped with the rechargeable battery 1 can be prevented.

In this regard, the excess pressure container 38 can be formed by a foil bag, according to an embodiment variant of the rechargeable battery 1, for minimizing the weight. The foil bag is particularly formed by the previously described single-layer or multi-layer film(s) 4 and/or 9 of the cooling device 2, in particular formed in one piece with the film 4, with which the cooling channels are formed. With this, the compactness of the cooling device 2, among other things, can be improved.

According to an embodiment variant, it may additionally be provided that the film bag be formed by an expansion region 39 in the cooling device 2. For this, the cooling device 2 formed by the single-layer or multi-layer film 4 and/or 9 can have another seam 24, which surrounds, and thus forms, said expansion region 39, as it is shown in FIG. 12. In the event of an excess pressure after the breakage of the predetermined breaking seam 37, excess pressure in the coolant channel 5 linking to the predetermined breaking seam 37 is then released into said expansion region 39 without getting into the environment.

The exemplary embodiments show and/or describe possible embodiment variants of the rechargeable battery 1, while it should be noted at this point that diverse combinations of the individual embodiment variants are also possible.

Finally, as a matter of form, it should be noted that for ease of understanding of the structure of the rechargeable battery 1, the rechargeable battery 1 and/or elements thereof are not obligatorily depicted to scale.

LIST OF REFERENCE NUMBERS 1 rechargeable battery
2 cooling device
3 cell
4 film
5 coolant channel
6 web
7 film
8 connection area
9 film
10 plastic film
11 plastic film
12 enforcement layer
13 enforcement layer
14 metal film
15 metal film
16 holding element
17 support element
18 covering
19 stiffening element
20 intermediate space
21 distance
21a rechargeable battery lid
22 foam element
23 traction element
24 seam
25 seam support element
26 beading
27 stiffening rib
28 coolant inlet
29 coolant outlet
30 mold piece
31 coolant channel connection
32 coolant channel connection
33 sealing element
34 excess pressure element
35 inlet
36 outlet
37 predetermined breaking seam
38 excess pressure container
39 expansion region

The invention claimed is:

1. A rechargeable battery comprising:
   at least one storage module for electrical energy; and
   at least one cooling device for cooling or controlling the temperature of the at least one storage module;
   wherein the cooling device has a single-layer or multi-layer film and is lying with this film against the at least one storage module;
   wherein the single-layer or multi-layer film forms multiple coolant channels;
   wherein liquid-tight seams are formed between the coolant channels;
   wherein the cooling device has an inner surface and an outer surface opposite the inner surface;
   wherein the inner surface borders the coolant channels;
   wherein the cooling device is provided with at least one stiffening element;
   wherein the stiffening element is an at least concavely and/or convexly curved surface element arranged partially distanced from the single-layer or multi-layer film, forming an intermediate space between the outer surface and the stiffening element; and
   wherein the stiffening element is provided with beadings forming seam support elements for liquid-tight seams of the single-layer or multi-layer film.

2. The rechargeable battery according to claim 1, wherein the concavely or convexly curved surface element is integrated into or at least partially forms a rechargeable battery lid.

3. The rechargeable battery according to claim 1, wherein a foam element or a casting resin element is arranged in the intermediate space.

4. The rechargeable battery according to claim 3, wherein the concavely or convexly curved surface element and/or the single-layer or multi-layer film is connected to the foam element or the casting resin element.

5. The rechargeable battery according to claim 1, wherein the stiffening element is provided with a traction element.

6. The rechargeable battery according to claim 3, wherein the liquid-tight seams are provided with at least one further seam support element.

7. The rechargeable battery according to claim 6, wherein the further seam support element is formed by the at least one foam element or the casting resin element, which abuts on the liquid-tight seams for this purpose.

8. The rechargeable battery according to claim 6, wherein the liquid-tight seams are provided with further seam support elements on first and second sides of the seams.

9. The rechargeable battery according to claim 1, further comprising at least one stiffening rib formed on the surface element.

10. The rechargeable battery according to claim 1, wherein the cooling device comprises at least one coolant inlet and at least one coolant outlet, wherein the coolant inlet and the coolant outlet are arranged in an integral mold piece.

11. The rechargeable battery according to claim 10, wherein at least one sealing element is integrated into the mold piece for the sealing connection of the mold piece to the single-layer or multi-layer film.

* * * * *